(12) United States Patent
Fuse et al.

(10) Patent No.: US 6,875,068 B2
(45) Date of Patent: Apr. 5, 2005

(54) COVER STRUCTURE FOR A SHAFT COUPLING OF A PERSONAL WATERCRAFT

(75) Inventors: Tomohiro Fuse, Saitama (JP); Hisashi Matsuo, Saitama (JP); Masahiko Tsuchiya, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/660,105

(22) Filed: Sep. 11, 2003

(65) Prior Publication Data

US 2004/0082234 A1 Apr. 29, 2004

(30) Foreign Application Priority Data

Sep. 11, 2002 (JP) ........................................ 2002-265912

(51) Int. Cl.⁷ ............................................. B63H 23/34
(52) U.S. Cl. ........................................................ 440/83
(58) Field of Search ............................. 114/361; 440/83

(56) References Cited

U.S. PATENT DOCUMENTS 3,796,280 A * 3/1974 Thien et al. ................. 181/204
5,256,089 A * 10/1993 Kobayashi et al. ........... 440/38
6,382,168 B1 * 5/2002 Sayama et al. .......... 123/195 C

FOREIGN PATENT DOCUMENTS

JP          09281132 A       10/1997

* cited by examiner

*Primary Examiner*—Stephen Avila
(74) *Attorney, Agent, or Firm*—Carrier, Blackman & Associates, P.C.; William D. Blackman; Joseph P. Carrier

(57) ABSTRACT

In a personal watercraft with an engine 17 disposed at a central portion of a craft body and a water jet propeller 18 disposed at a stern of the watercraft, a propeller shaft 33 of the water jet propeller is connected to an end 31 of a crankshaft of the engine by a shaft coupling 32. The shaft coupling as well as the ends of the crankshaft and propeller shaft are covered from the top and from both sides with a cover apparatus 22, including a first cover section 35 for removable attachment to the engine or the hull, and a second cover section section 36 for removable attachment to the first cover section. When the cover is removed, it only of the second cover section section, and even if the space for working is small, not much time is required for removal and re-attachment thereof.

19 Claims, 7 Drawing Sheets

COVER STRUCTURE FOR A SHAFT COUPLING OF A PERSONAL WATERCRAFT

CROSS-REFERENCE TO RELATED APPLICATIONS

The present application claims priority under 35 U.S.C. 119, based on Japanese patent application No. 2002-265912, filed Sep. 11, 2002.

BACKGROUND OF THE INVENTION

1. Field of the Invention

The present invention relates to an apparatus for enclosing a shaft coupling of a personal watercraft, and to methods of using the described apparatus. More particularly, the present invention relates to an apparatus that encloses a shaft coupling in a personal watercraft, in which the apparatus is secured in a manner such that ease of maintenance or repair is greatly improved.

2. Description of the Background Art

A personal watercraft is known as a small size craft that is constructed and arranged to glide on the surface of a sea or lake. Many jet skis and other different types of personal watercraft are known and are commercially available. One example of a personal watercraft is described in Japanese Laid-Open Patent No. Hei 9-281132.

According to a conventional apparatus for enclosing a shaft coupling of a personal watercraft, when the shaft coupling and shafts connected to each other thereby are enclosed, the surrounding space around them is covered with a unitary member (refer to, for example, Japanese Laid-Open Patent No. Hei 9-281132).

FIG. 9 is a copy of FIG. 1 of Japanese Laid-Open Patent No. Hei 9-281132, and is a schematic view of a personal watercraft which employs a conventional apparatus for enclosing a shaft coupling.

As shown in FIG. 9, the conventional enclosing apparatus is formed in shape of a bottomless box, such that it encloses an output shaft 11A of an engine 11, a coupling 24, and a front side of an impeller shaft 23. A lower end portion of the bottomless box is secured to an engine compartment 14 and/or a propeller chamber 15.

The conventional cover apparatus described above requires much time for removal thereof to enable inspection or repairs to take place. A cover-removing operation is performed in a state wherein additional parts, such as an exhaust expansion tube 40, are incorporated in the narrow engine compartment 14 or propeller chamber 15. The space available for performing the cover-removing operation is limited, and much time is required for removal and re-attachment of the cover.

Therefore, it would be advantageous if a cover apparatus for a shaft coupling of a personal watercraft could be provided which did not require much time for removal and re-attachment thereof, even where the space for the operation is limited.

Although the known devices have some utility for their intended purposes, a need still exists in the art for an improved shaft coupling cover for a personal watercraft. In particular, there is a need for an improved shaft coupling cover which is removable in less time than the previously known shaft coupling covers, even where there is only a small amount of working space in the personal watercraft's engine compartment.

SUMMARY OF THE INVENTION

The present invention provides a coupling cover apparatus for use in covering and enclosing a shaft coupling of a personal watercraft, and methods of using the described cover apparatus.

A coupling cover apparatus according to a first illustrative embodiment of the invention is provided for covering a shaft coupling of a personal watercraft having a craft body, a hull, an engine disposed at a central portion of the craft body, and a jet propeller disposed at a stern thereof.

The watercraft also includes a shaft coupling where a propeller shaft for the jet propeller is connected to an end of the engine's crankshaft.

The coupling cover apparatus hereof is provided for covering the shaft coupling of the crankshaft and the propeller shaft from above and on the left and right sides thereof.

The coupling cover apparatus includes a first cover section for removably attaching to the engine or to the watercraft hull.

The coupling cover apparatus also includes a second cover section for removably attaching to the first cover section, and for cooperating therewith to cover the shaft coupling and an end portion of the propeller shaft.

In one embodiment of the invention, the first cover section includes a supporting cradle for a water hose integrally provided thereon.

Accordingly, it is an object of the present invention to provide a method and apparatus for enclosing a shaft coupling of a personal watercraft.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENTS

Figure 1:
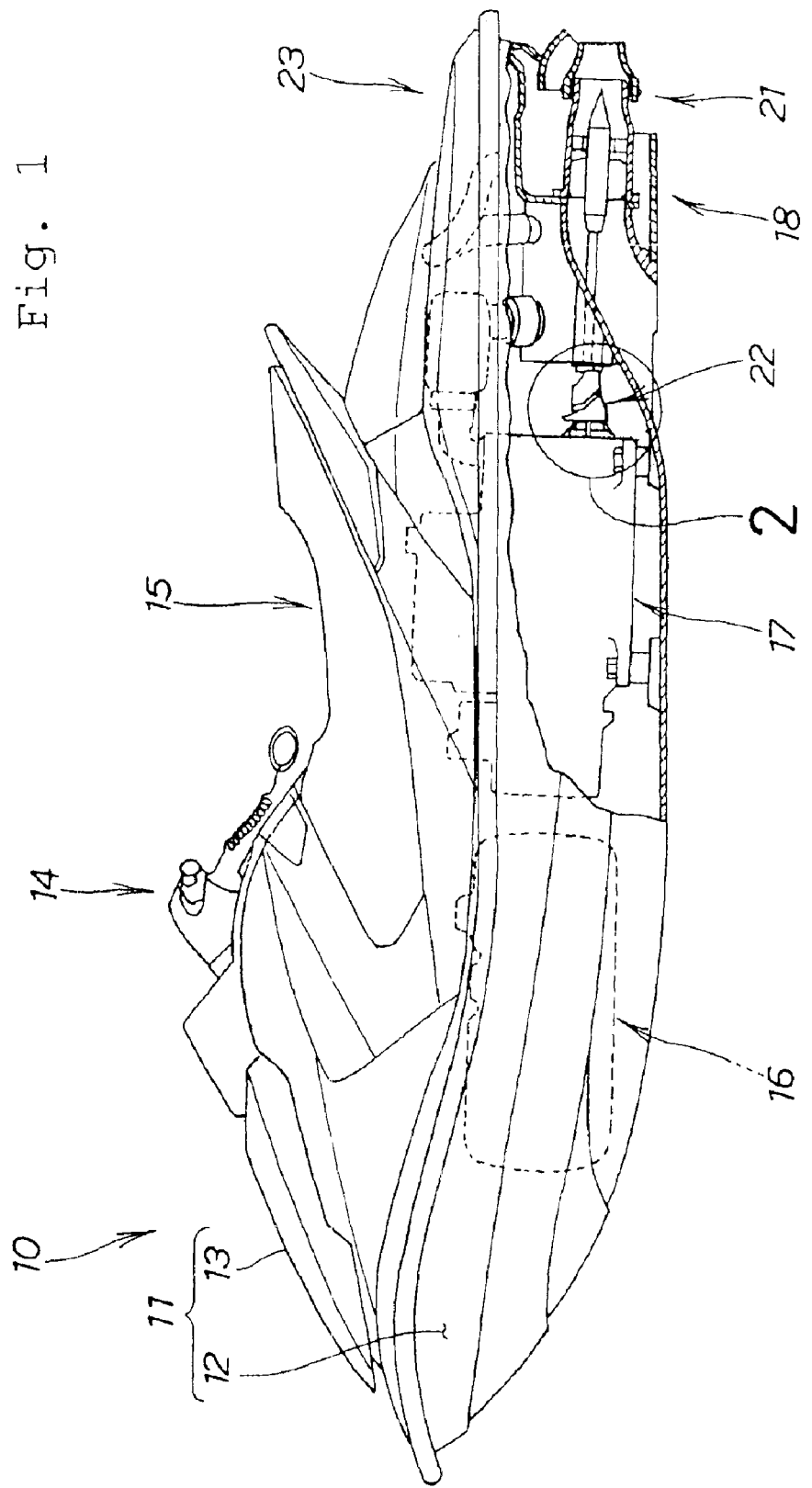
FIG. 1 is a side elevational view of a personal watercraft which employs a coupling cover apparatus for a shaft coupling according to a selected illustrative embodiment of the present invention.

In the following, an embodiment of the present invention is described with reference to the accompanying drawings. It is to be noted that the drawings should be viewed in the direction of reference characters.

Throughout the following detailed description, relative terms such as "front", "rear", "left", "right", "top", "bottom" and the like are used in reference to components under discussion in the installed configuration thereof, as shown in the drawings, and particularly as considered from the vantage point of a driver seated in the watercraft. It will be understood that when removed from the watercraft, the components may be inverted, turned sideways or rotated at a selected angle, and when so moved, these relative positional terms may no longer be accurate.

FIG. 1 is a side elevational view of a personal watercraft 10, which employs a coupling cover apparatus for a shaft coupling according to a selected illustrative embodiment of the present invention.

The personal watercraft 10 includes a craft body 11 formed from a hull 12 and a deck 13 joined to and situated above the hull 12. The personal watercraft further includes a steering handle member 14, disposed at a substantially central position of the deck 13, and a seat 15 provided in back of the steering handle member 14 and placed on the deck 13. Reference numeral 23 denotes a stern at the back of the watercraft 10.

Still further, the watercraft 10 includes a fuel tank 16 and an engine 17 attached to the center of the hull 12. The watercraft 10 also includes a water jet propeller 18 as a jet propeller operatively connected to the engine 17, and a steering nozzle 21 provided in back of the water jet propeller 18.

A coupling cover apparatus 22 according to a selected illustrative embodiment of the present invention, is disposed between the engine 17 and the water jet propeller 18, as will be discussed further herein.

Figure 2:
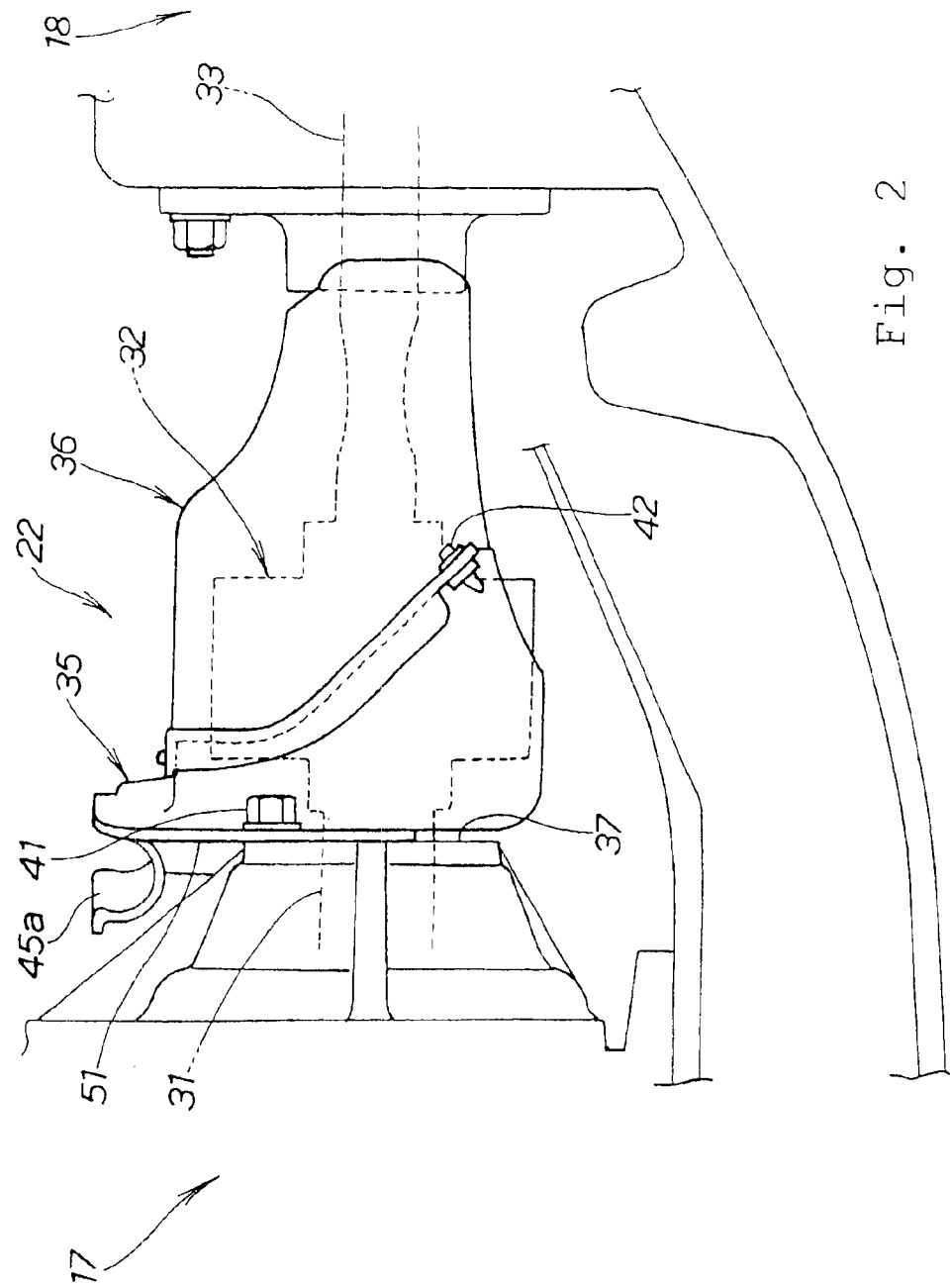
FIG. 2 is a detail view of the portion of FIG. 1 denoted by reference numeral 2, showing the shaft coupling and related components in phantom.

FIG. 2 is a detail view of the portion of FIG. 1 denoted by reference numeral 2, showing the shaft coupling and related components in phantom. Referring now to FIG. 2, a crankshaft end 31 is shown in phantom extending out of the back of the engine 17. A shaft coupling 32, and a propeller shaft 33 of the water jet propeller 18 are also shown in phantom, and these components are also shown more clearly in FIG. 8.

The coupling cover apparatus 22 according to the present invention is also shown in FIG. 2, and is provided to cover the shaft coupling 32, formed by the connection between the crankshaft end 31 and the front of the propeller shaft 33. The coupling cover apparatus 22 will also be referred to herein as the cover 22 for purposes of simplicity in explanation. The cover 22 is provided for covering the shaft coupling 32 and the front end of the propeller shaft 33.

The cover 22 is formed as a two-piece cover assembly, and includes a first cover section 35 and a second cover section 36. The first cover section is provided for removable attachment to the engine 17, and the second cover section 36 is provided for removable attachment to the first over section 35, using a suitable fastener.

Reference numeral 37 denotes a bell housing of the engine 17, and reference numeral 41 denotes attachment bolts for attaching the cover to the bell housing 37 of the engine 17. It will be understood that a substantially identical bolt 41 is provided on the opposite side of the cover 22 from that shown in FIG. 2.

Reference numeral 42 denotes a removable plastic rivet, which may be used for securing the second cover section 36 to the first cover section 35. It will be understood that other known fasteners may be substituted for the plastic rivet 42.

The cover 22 is formed from a durable plastic resin, which is suitably selected in accordance with applicable conditions, such as the molding method used for manufacture thereof.

Figure 3:
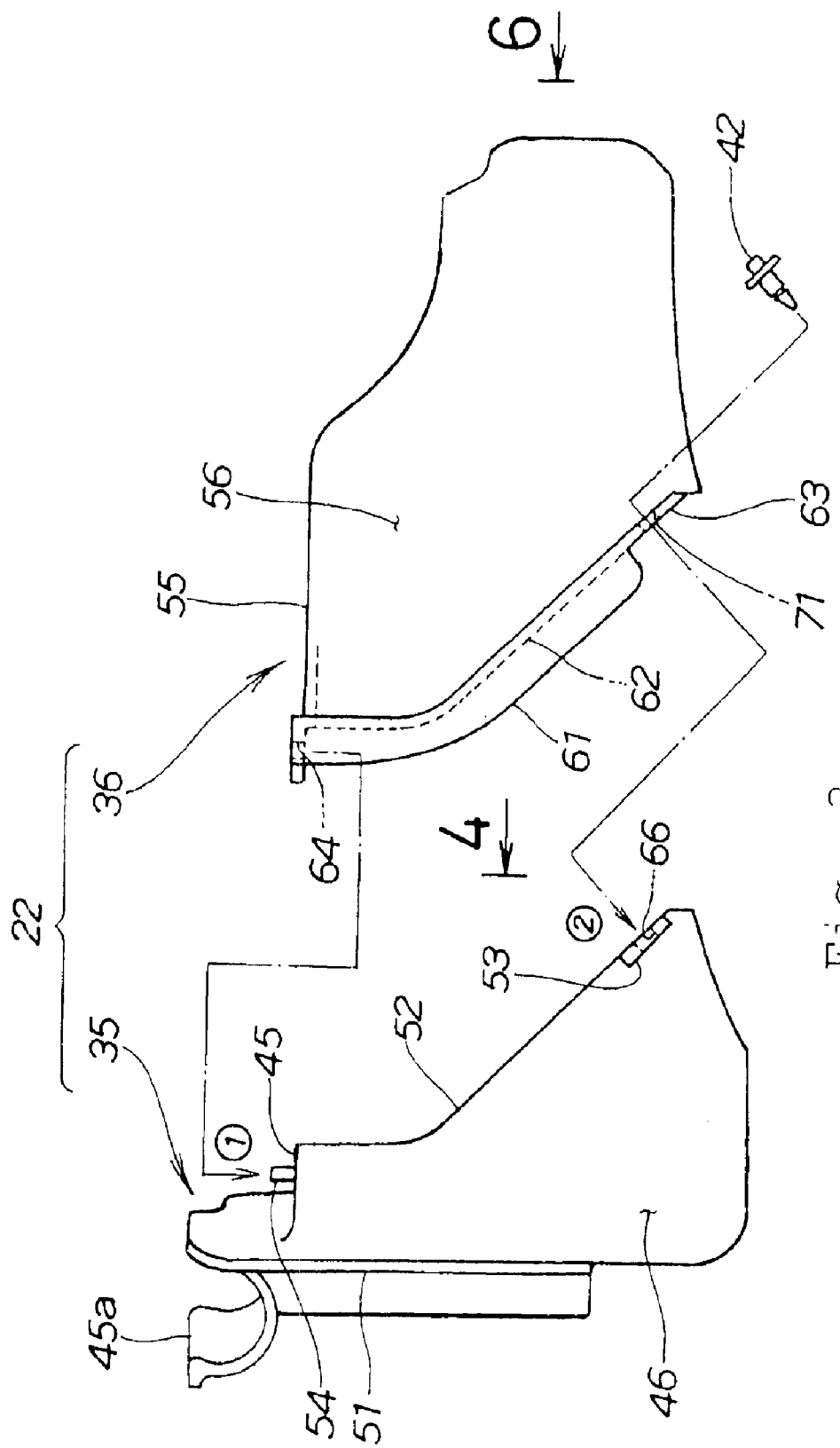
FIG. 3 is an exploded view of the coupling cover apparatus of FIGS. 1–2.

FIG. 3 is an exploded perspective view of the cover according to the selected embodiment of present invention, and shows the first cover section 35 and the second cover section 36.

First Cover Section

The first cover section 35 includes left and right side portions 46, 47 (refer to FIG. 4) integrally molded together with an upper portion 45. An attachment flange 51 is formed extending transversely outwardly at the front end of the first cover section, as shown, for placement in a corresponding aligned relationship to the bell housing 37 (refer to FIG. 2).

An inclined fitting portion 52 is formed as a ramp extending downwardly in a sloped configuration from an upper end proximate the front of the second cover section 36, to a terminal part proximate the back of the first cover section 35.

An inclined contacting portion 62, having structure corresponding to the shape of the inclined fitting portion 52, is provided on the second cover section 36, as will be further explained herein.

The use of the inclined fitting portion 52 allows a substantial portion of the shaft coupling 32 to be exposed when the second cover section 36 is removed and the first cover section 35 is left in place bolted to the engine bell housing 37. This permits a professional repair person to gain access to the shaft coupling 32 by removing only the second section 36 of the coupling cover 22.

A pair of alignment tabs 53, 53 (refer to FIGS. 4–5) are integrally formed with and extend outwardly from opposite sides of the first cover section 35, and the tabs 53, 53 are aligned with the inclined fitting portion 52.

An integral anchor post 54 and a supporting cradle 45a for a water hose are also formed on the upper portion 45 of the first cover section 35, as seen in FIG. 3.

Figure 4:
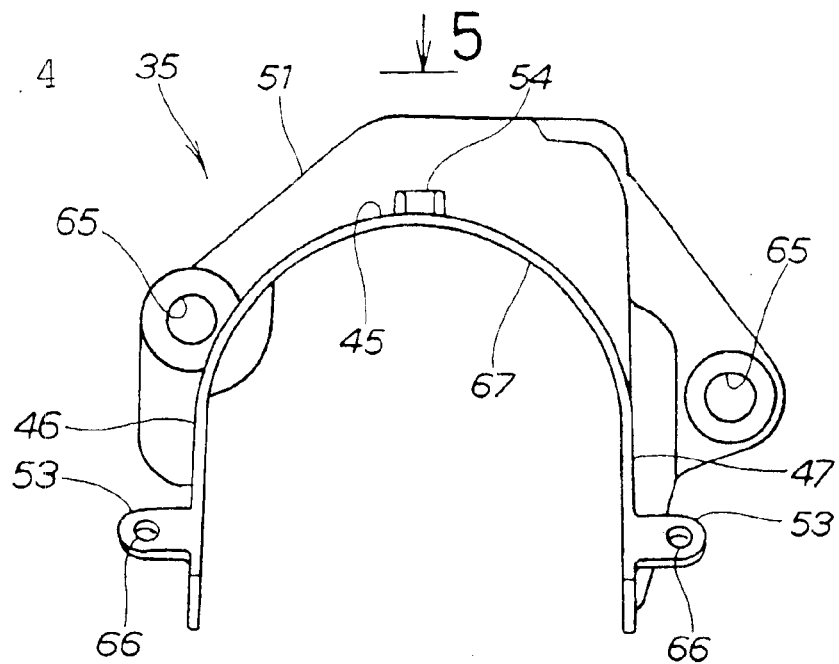
FIG. 4 is a rear plan view of a first cover section which is one component of the coupling cover apparatus of FIG. 2, as viewed in the direction indicated by an arrow mark 4 of FIG. 3.

FIG. 4 shows that the first cover section 35 has mounting holes 65, 65 formed therethrough to receive the mounting bolts 41 (refer to FIG. 2), and also has a central opening 67 formed therein to receive the shaft coupling 32.

Figure 5:
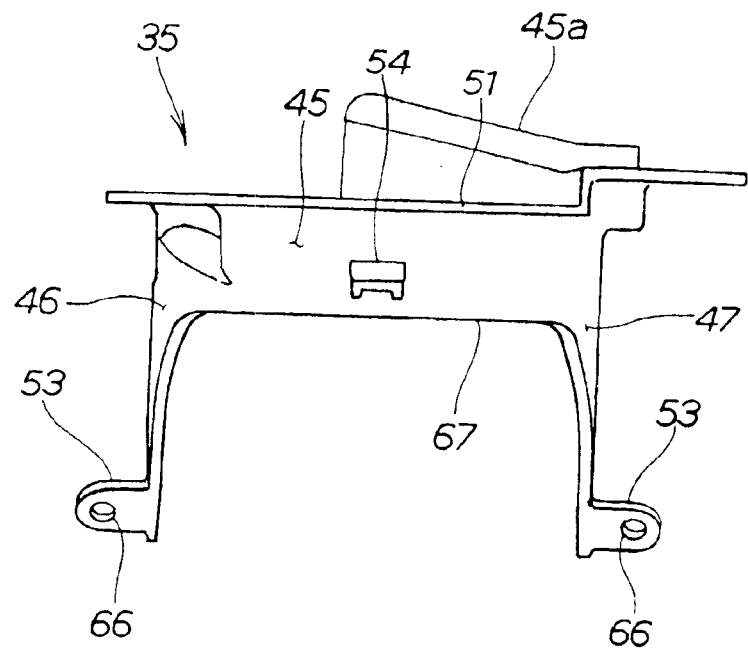
FIG. 5 is a top plan view of the first cover section of FIG. 4, as viewed in the direction indicated by an arrow mark 5 of FIG. 4.

FIG. 5 shows the upper portion 45 of the first cover section 35, the left and right side portions 46, 47 formed continuously to the upper portion 45, the anchor post 54 formed at a central portion of the upper portion 45, the first fitting holes 66, 66 of the alignment tabs 53, 53, and the opening 67.

Second Cover Section

The second cover section 36 includes left and right side portions 56, 57 (refer to FIG. 6) integrally formed with an upper central portion 55. A positioning lip 61 and an inclined contacting portion 62 (refer to FIG. 3) are formed at the front end of the second cover section 36. The second cover section 36 also includes a pair of alignment tabs 63, 63 (refer to FIG. 6), integrally formed on opposite sides thereof, such that they overlap with the alignment tabs 53, 53 of the first cover section 35 when the cover sections 34, 35 are in an aligned configuration.

The removable plastic rivets 42 are provided to be removably inserted through the alignment tabs on each side of the first and second cover sections 34, 35, when they are in the aligned configuration shown in FIG. 2. Fitting holes 66, and 71 are provided in each of the respective alignment tabs 53, 63, and the removable plastic rivets 42 (refer to FIG. 3) fit through the fitting holes 66, 71.

A rectangular central opening 64 is formed in an upper portion of the positioning lip 61, to receive the anchor post 54 of the first cover section 35 as an aid to quickly and easily aligning the cover sections 34, 35.

Figure 6:
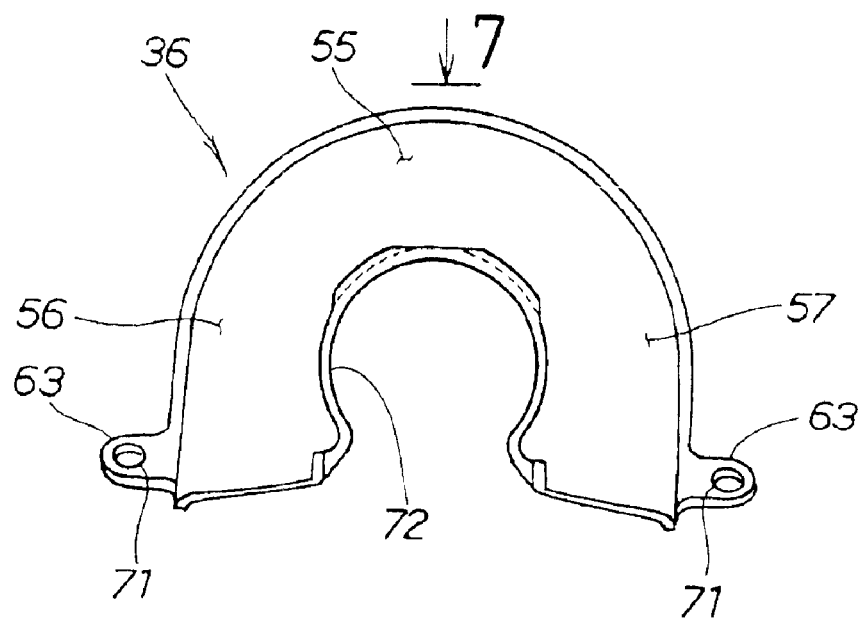
FIG. 6 is a rear plan view of a second cover section which is another component of the coupling cover apparatus of FIG. 2, as viewed in the direction indicated by an arrow mark 6 of FIG. 3.

FIG. 6 is a rear plan view of the second cover section, as viewed in the direction indicated by an arrow mark 6 of FIG. 3. FIG. 6 shows that the second fitting holes 71, 71 for receiving the removable plastic rivets 42 (refer to FIG. 3) are perforated in the alignment tabs 63, 63 of the second cover section 36, and an opening 72 is formed at a rear end of the second cover section 36 to allow the propeller shaft 33 of the water jet propeller to pass outwardly from the cover assembly 22.

Figure 7:
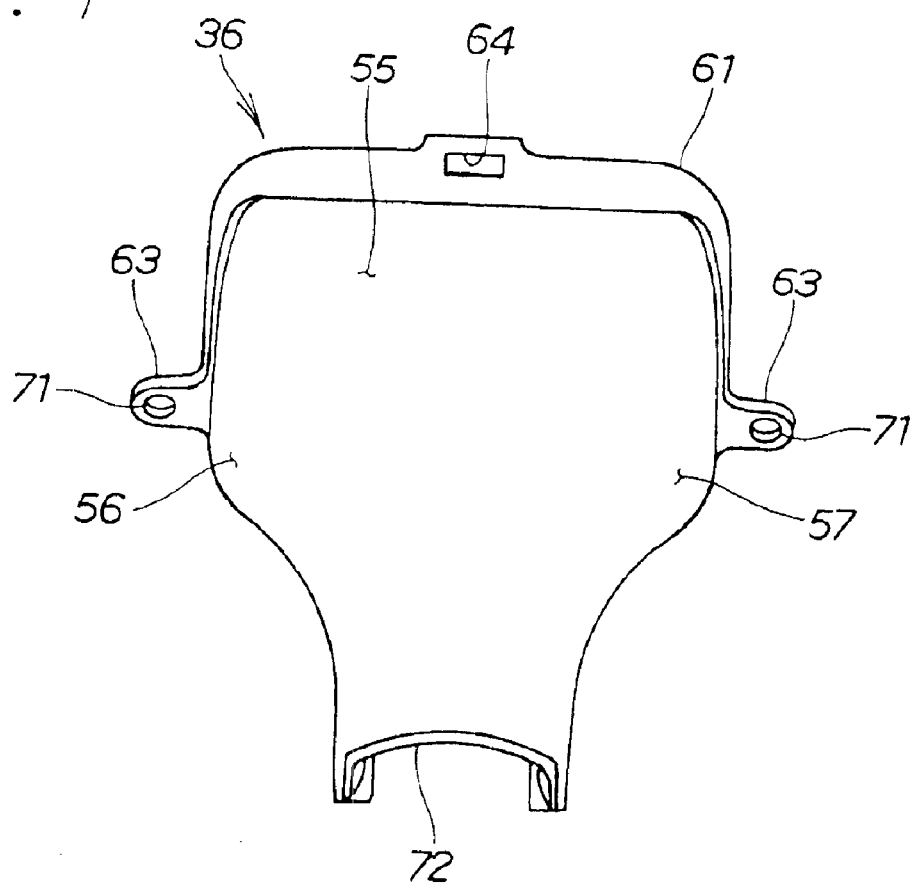
FIG. 7 is a top plan view of the second cover section of FIG. 6, as viewed in the direction indicated by an arrow mark 7 of FIG. 6.

FIG. 7 is a top plan view of the second cover section 36, as viewed in the direction indicated by an arrow mark 7 of FIG. 6. FIG. 7 shows the upper central portion 55 of the second cover section 36, the left and right side portions 56, 57 formed integrally with the upper central portion 55, and the positioning lip 61 formed integrally with the front end of the upper central portion 55. The rectangular central opening 64 formed in at an upper central portion of the positioning lip 61 can also be seen in FIG. 7, as well as the alignment tabs 63, 63 with the second fitting holes 71, 71 formed therein, and the rear opening 72.

Subsequently, an example of a method of attaching the cover 22 to the watercraft 10 is described.

First, the rectangular central opening 64 in the upper portion 55 of the second cover section 36 is fitted over the anchor post 54 formed on the upper portion 45 of the first cover section 35 as seen in FIG. 3. Then, the positioning lip 61 of the second cover section 36 is aligned with the inclined fitting portion 52 of the first cover section 35, and the inclined contacting portion 62 is placed onto the inclined fitting portion 52 so that the alignment tabs 63, 63 of the second cover section 36 are placed in an overlapping relationship onto the alignment tabs 53, 53 of the first cover section 35. Thereafter, the removable plastic rivets 42, 42 are fitted as indicated by an arrow mark into the first fitting holes 66, 66 of the alignment tabs 53, 53 and through the second fitting holes 71, 71 of the alignment tabs 63, 63, whereupon the two-piece cover 22 changes into the cover apparatus 22, in the form of a unitary member. Finally, the flange portion 51 of the cover apparatus 22 is attached to the bell housing 37 of the engine 17 by means of the mounting bolts 41, 41.

Action of the cover apparatus for a shaft coupling of the personal watercraft described above is described below.

Figure 8:
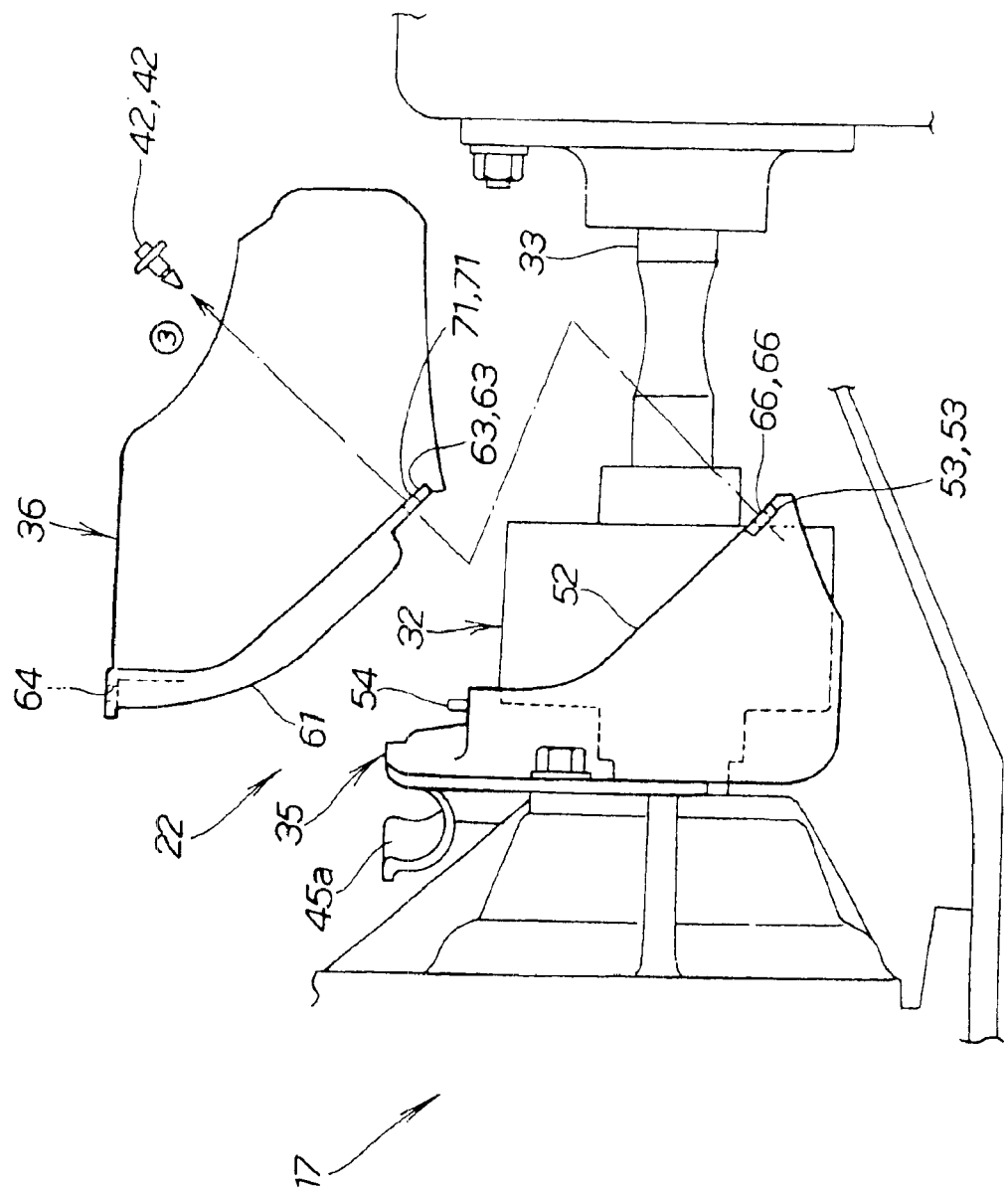
FIG. 8 is a partially exploded environmental side plan view of the cover apparatus for a shaft coupling according to the present invention, also showing the shaft coupling and related components.
Figure 9:
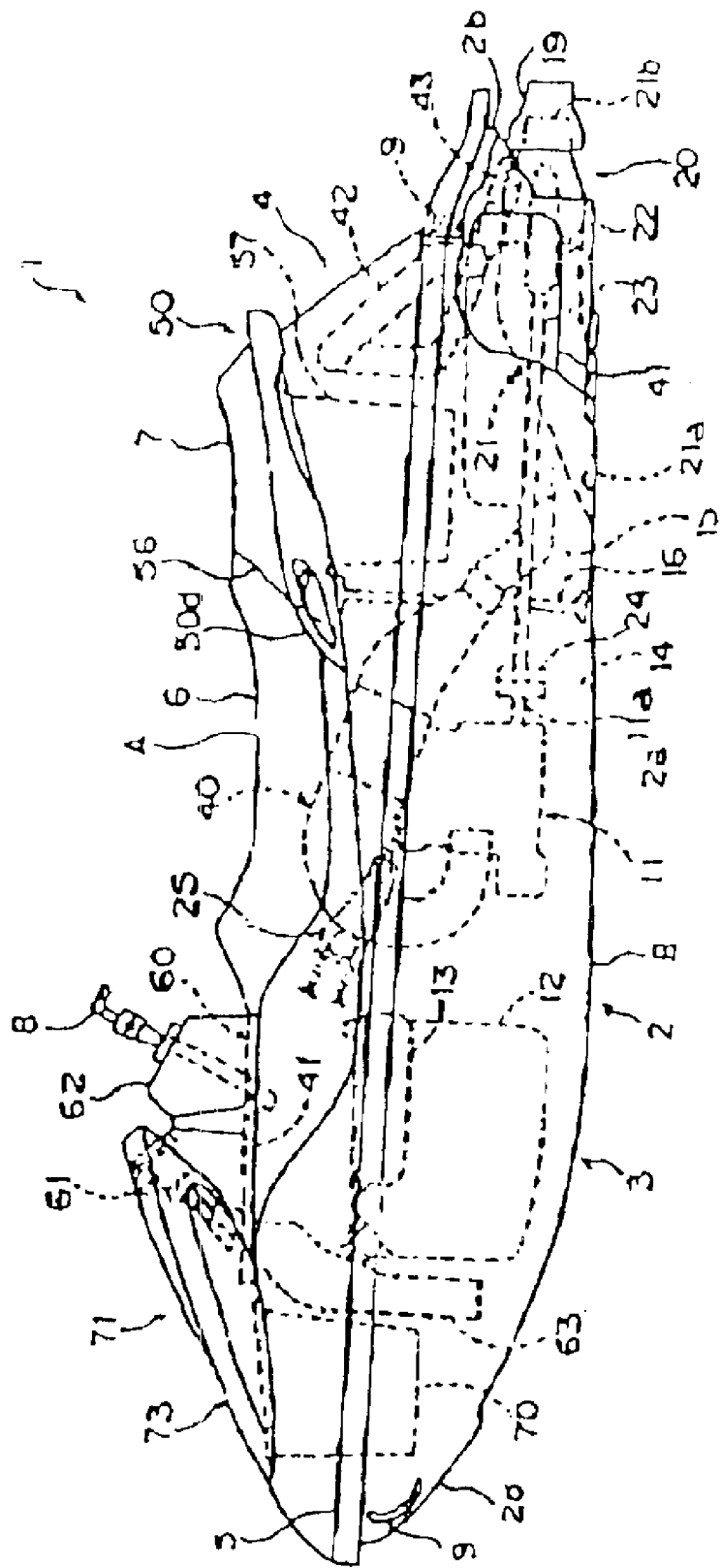
FIG. 9 is a schematic view of a prior art personal watercraft which employs a conventional cover apparatus.

FIG. 8 is a partially exploded environmental side plan view of the cover apparatus for a shaft coupling according to the present invention, showing the shaft coupling and related components.

In order to remove the cover 22, the removable plastic rivets 42, 42 are pulled off as indicated by an arrow mark, and the second cover section 36 is then easily lifted off and removed.

Since the cover apparatus 22 is composed of the first cover section 35 removably attached to the engine 17 and the second cover section 36 removably attached to the first cover section 35, when it is to be removed, it is considered access to the shaft coupling, for maintenance and repair, may be obtained by removing only the second cover section 36. Consequently, even if the space for working is small, only a short time is required for removal and re-attachment.

Since the first cover section 35 integrally includes the supporting cradle 45a for a water hose, a water hose can be supported by the first cover section 35. Thus, for example, when the shaft coupling is disassembled, there is no necessity to remove both the second cover section 36 and the water hose. Consequently, not much time is required.

Since the inclined fitting portion 52 and the anchor post 54 are formed on the first cover section 35, while the positioning lip 61 and the rectangular central opening 64 are formed on the second cover section 36, the first cover section 35 and the second cover section 36 can be easily aligned and positioned relative to each other by mating the rectangular central opening with the anchor post. Consequently, correct positioning of the sections 35, 36, prior to the second cover section 36 being lowered on to the first cover section 35 from above, is significantly facilitated. Accordingly, not much time is required for re-attachment of the cover.

Further, since the respective alignment tabs 53, 53, 63, 63 are inclined on the cover 22, when the second cover section 36 is to be connected to the first cover section 35, the first fitting holes 66, 66 and the second fitting holes 71, 71 can be confirmed readily by visual observation from above. Consequently, not much time is required for re-attachment of the cover.

It is to be noted that a supporting cradle for supporting a pipe and/or a recess for preventing interference of a pipe or the like may be provided on the cover 22 shown in the embodiment of the present invention.

The shape of the cover 22 is a mere example and may naturally be altered, depending upon specifications such as those of the shape of the flange portion of the engine or the shape of the shaft coupling.

As noted, the cover apparatus 22 includes the first cover section 35 for removable attachment to the engine 17 or the hull 12, and the second cover section 36 for removable attachment to the first cover section, and for covering the shaft coupling and the propeller shaft. Consequently, when the shaft coupling is to be disassembled, it is only necessary to remove the second cover section. Therefore, even if the working space is small, not much time is required for removal and re-attachment.

Also, the first cover section includes the supporting cradle 45a for a water hose integrally provided thereon. Therefore, the water hose can be supported by the first cover section 35, and does not need to be disturbed to repair or replace part of the shaft coupling 32. Thus, for example, when the shaft coupling is to be disassembled, there is no necessity to remove the water hose and not much time is required.

Although the present invention has been described herein with respect to a limited number of presently preferred embodiments, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

Having, thus, described the invention, what is claimed is:

1. A coupling cover apparatus for covering a shaft coupling of a personal watercraft having a craft body, a hull, an engine disposed at a central portion of the craft body and a jet propeller disposed at a stern thereof, wherein the watercraft also includes a propeller shaft for said jet propeller, wherein said propeller shaft is connected to a crankshaft of said engine at a shaft coupling;

said coupling cover apparatus provided for covering the ends of said crankshaft and said propeller shaft from above and on the left and right sides thereof, said coupling cover apparatus comprising:

a first cover section for removably attaching to said engine or to said hull, and a second cover section for removably attaching to said first cover section, and for cooperating therewith to cover said shaft coupling, wherein said first cover section comprises a hose support cradle for a water hose.

2. The coupling cover of claim 1, wherein the hose support cradle is formed as an integral part of said first cover section.

3. The coupling cover of claim 1, wherein the second cover section can be temporarily removed from the watercraft without requiring removal of the first cover section.

4. The coupling cover of claim 3, wherein removal of the second cover section gives sufficient access to the shaft coupling to allow maintenance of said coupling without requiring removal of the first cover section.

5. A coupling cover apparatus for covering a shaft coupling of a personal watercraft having a craft body, a hull, an engine disposed at a central portion of the craft body and a jet propeller disposed at a stern thereof, wherein the watercraft also includes a propeller shaft for said jet propeller, wherein said propeller shaft is connected to a crankshaft of said engine at a shaft coupling;

said coupling cover apparatus provided for covering the ends of said crankshaft and said propeller shaft from above and on the left and right sides thereof, said coupling cover apparatus comprising:

a first cover section for removably attaching to said engine or to said hull, and a second cover section for removably attaching to said first cover section, and for cooperating therewith to cover said shaft coupling, wherein one of said first and second cover sections comprises an anchor post extending outwardly from a top central portion thereof, and the other of said first and second cover sections has a mounting hole formed in a top central portion thereof for receiving said anchor post therein to aid in aligning said first and second cover sections.

6. A coupling cover apparatus for covering a shaft coupling of a personal watercraft having a craft body, a hull, an engine disposed at a central portion of the craft body and a jet propeller disposed at a stern thereof, wherein the watercraft also includes a propeller shaft for said jet propeller, wherein said propeller shaft is connected to a crankshaft of said engine at a shaft coupling;

said coupling cover a apparatus provided for covering the ends of said crankshaft and said propeller shaft from above and on the left and right sides thereof, said coupling cover apparatus comprising:

a first cover section for removably attaching to said engine or to said hull, and a second cover section for removably attaching to said first cover section, and for cooperating therewith to cover said shaft coupling, wherein said second cover section comprises a positioning lip extending outwardly from a top central portion thereof, for placement overlapping a top central portion of said first cover section.

7. A coupling cover apparatus for covering a shaft coupling of a personal watercraft having a craft body, a hull, an engine disposed at a central portion of the craft body and a jet propeller disposed at a stern thereof, wherein the watercraft also includes a propeller shaft for said jet propeller, wherein said propeller shaft is connected to a crankshaft of said engine at a shaft coupling;

said coupling cover a apparatus provided for covering the ends of said crankshaft and said propeller shaft from above and on the left and right sides thereof, said coupling cover apparatus comprising:

a first cover section for removably attaching to said engine or to said hull, and a second cover section for removably attaching to said first cover section, and for cooperating therewith to cover said shaft coupling, wherein each of said first and second cover sections has an alignment tab formed on a side portion thereof to facilitate alignment of said cover sections with one another, each of said alignment tabs having a fitting hole formed therethrough to receive a fastener.

8. A coupling cover apparatus for covering a shaft coupling of a personal watercraft having a craft body, a hull, an engine disposed at a central portion of the craft body and a jet propeller disposed at a stern thereof, wherein the watercraft also includes a propeller shaft for said jet propeller, wherein said propeller shaft is connected to a crankshaft of said engine at a shaft coupling;

said coupling cover a apparatus provided for covering the ends of said crankshaft and said propeller shaft from above and on the left and right sides thereof, said coupling cover apparatus comprising:

a first cover section for removably attaching to said engine or to said hull, and a second cover section for removably attaching to said first cover section, and for cooperating therewith to cover said shaft coupling, wherein the first cover section comprises an inclined fitting portion extending downwardly in a sloped configuration from an upper end proximate the front of the second cover section to a terminal part proximate the back of the first cover section in an assembled configuration of the coupling cover, and wherein the second cover section comprises an inclined contacting portion substantially contending in shape to the inclined fitting portion.

9. The coupling cover of claim 7, further comprising at least two removable plastic rivets for placement through said fitting holes of said alignment tabs to temporarily and disengageably fasten said cover sections together in an aligned configuration.

10. The coupling cover of claim 8, wherein each of said first and second cover sections has an alignment tab formed on a side portion thereof to facilitate alignment of said cover sections with one another, each of said alignment tabs having a fitting hole formed therethrough to receive a fastener, and further wherein said alignment tabs are oriented to be substantially in line with said inclined fitting portion.

11. A coupling cover apparatus for covering a shaft coupling of a personal watercraft having a craft body, a hull, an engine disposed at a central portion of the craft body and a jet propeller disposed at a stern thereof, wherein the watercraft also includes a propeller shaft for said jet propeller, wherein said propeller shaft is connected to a crankshaft of said engine at a shaft coupling;

said coupling cover apparatus provided for covering the ends of said crankshaft and said propeller shaft from above and on the left and right sides thereof, said coupling cover apparatus comprising:

a first cover section for removably attaching to said engine or to said hull, and a second cover section for removably attaching to said first cover section and for cooperating therewith to cover said shaft coupling;

wherein the first cover section comprises an inclined fitting portion extending downwardly in a sloped configuration from an upper end proximate the front of the second cover section to a terminal part proximate the back of the first cover section in an assembled configuration of the coupling cover, and wherein the second cover section comprises an inclined contacting portion substantially corresponding in shape to the inclined fitting portion.

12. The coupling cover apparatus of claim 11, wherein said first cover section comprises a hose support cradle for a water hose.

13. The coupling cover of claim 12, wherein the hose support cradle is formed as an integral part of said first cover section.

14. The coupling cover of claim 11, wherein the second cover section can be temporarily removed from the watercraft without requiring removal of the first cover section.

15. The coupling cover of claim 14, wherein removal of the second cover section gives sufficient access to the shaft coupling to allow maintenance of said coupling without requiring removal of the first cover section.

16. The coupling cover of claim 11, wherein one of said first and second cover sections comprises an anchor post extending outwardly from a top central portion thereof, and the other of said first and second cover sections has a mounting hole formed in a top central portion thereof for receiving said anchor post therein to aid in aligning said first and second cover sections.

17. The coupling cover of claim 11, wherein said second cover section comprises a positioning lip extending outwardly from a top central portion thereof, for placement overlapping a top central portion of said first cover section.

18. The coupling cover of claim 11, wherein each of said first and second cover sections has an alignment tab formed on a side portion thereof to facilitate alignment of said cover sections with one another, each of said alignment tabs having a fitting hole formed therethrough to receive a fastener.

19. A method of using a coupling cover apparatus for a shaft coupling installed on a personal watercraft, comprising the steps of:

a) removing a plurality of connecting fasteners from the coupling cover apparatus which connect first and second cover sections together;

b) lifting the second cover section of said cover apparatus off of the first cover section while leaving the first cover section installed; and c) accessing the shaft coupling while the first cover section remains in place.

* * * * *

UNITED STATES PATENT AND TRADEMARK OFFICE
CERTIFICATE OF CORRECTION

PATENT NO. : 6,875,068 B1
DATED : April 5, 2005
INVENTOR(S) : Tomohiro Fuse, Hisashi Matsuo and Masahiko Tsuchiya It is certified that error appears in the above-identified patent and that said Letters Patent is hereby corrected as shown below:

Column 7,
Line 49, change "cover a apparatus" to -- cover apparatus --.

Column 8,
Line 21, change "cover a apparatus" to -- cover apparatus --.
Line 37, change " contending in shape" to -- corresponding in shape --.

Signed and Sealed this

Thirtieth Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,875,068 B2  Page 1 of 1
APPLICATION NO. : 10/660105
DATED : April 5, 2005
INVENTOR(S) : Fuse et al.

It is certified that error appears in the above-identified patent and that said Letters Patent is hereby corrected as shown below:

Title page:
In section (57), the ABSTRACT, 10th line, change "section section 36" to --section 36--;
11th-12th lines, change "it only of the second cover section section," to --if only the second cover section,--.

Column 4:
Line 10, change "of present invention," to --of the present invention,--.
Line 37, change "FIGS. 4–5) are" to --FIGS. 4–5) is--.

Column 5:
Line 2, change "Fitting holes 66, and" to --Fitting holes 66 and--.
Line 26, change "formed in at an upper" to --formed in an upper--.

Column 8:
Line 1, change "cover a apparatus" to --cover apparatus--.

Signed and Sealed this

Twenty-first Day of April, 2009

JOHN DOLL
*Acting Director of the United States Patent and Trademark Office*